United States Patent
Choi

Patent Number: 5,907,463
Date of Patent: May 25, 1999

[54] OVERCURRENT PROTECTION CIRCUIT

[75] Inventor: Hyoung-Sik Choi, Suwon, Rep. of Korea

[73] Assignee: SamSung Electronics Co., Ltd., Suwon, Rep. of Korea

[21] Appl. No.: 08/914,029

[22] Filed: Aug. 14, 1997

[30] Foreign Application Priority Data

Aug. 14, 1996 [KR] Rep. of Korea .................. 96/33805

[51] Int. Cl.$^6$ ..................................................... H02H 3/00
[52] U.S. Cl. ............................ 361/93; 361/18; 361/58; 361/113
[58] Field of Search ............................ 361/18, 23, 24, 361/25, 58, 111, 113, 118, 93, 100

[56] References Cited

U.S. PATENT DOCUMENTS 5,003,451  3/1991  Gradl et al. ............................ 363/56
5,499,154  3/1996  Cullison ................................. 361/18

*Primary Examiner*—Jeffrey Gaffin
*Assistant Examiner*—Stephen W. Jackson
*Attorney, Agent, or Firm*—Robert E. Bushnell, Esq.

[57] ABSTRACT

An overcurrent protection circuit for a switching mode power supply which has a switching transformer for transforming a rectified voltage into a plurality of drive voltages and a pulse width modulation circuit for generating a pulse width modulation signal in response to a desired one of the drive voltages from the switching transformer. The overcurrent protection circuit is connected between a drive voltage output terminal of the switching transformer and a drive voltage input terminal of the pulse width modulation circuit. The overcurrent protection circuit consists of a parallel circuit composed of an inductance and a resistance. When the switching transformer is short-circuited, the overcurrent protection circuit accelerates a drop of the drive voltage which is supplied from the switching transformer to the pulse width modulation circuit. The overcurrent protection circuit rapidly cuts off an overcurrent due to a short-circuit which is caused in electric or electronic equipment containing the switching mode power supply device. Therefore, components in the equipment can be protected from the overcurrent due to a short-circuit.

2 Claims, 3 Drawing Sheets

OVERCURRENT PROTECTION CIRCUIT

CLAIM OF PRIORITY

This application makes reference to, incorporates the same herein, and claims all benefits accruing under 35 U.S.C. §119 from an application for OVERCURRENT PROTECTION CIRCUIT earlier filed in the Korean Industrial Property Office on Aug. 14, 1996 and there duly assigned Serial No. 33805/1996.

BACKGROUND OF THE INVENTION

1. Field of the Invention

The present invention relates to an overcurrent protection circuit for protecting components in equipment containing a switching mode power supply from overcurrent due to a short-circuit.

2. Description of the Related Art

Generally, a switching mode power supply has been widely used as a main power supply in small electric and electronic equipment. The switching mode power supply device is small in size, light in its weight, high in efficiency and stable in output voltage.

A switching mode supply normally includes a power input unit for inputting external commercial AC power, a rectifier for rectifying the AC power inputting by the power input unit into DC power, a switching transformer for transforming an output voltage from the rectifier into voltages of various levels using a plurality of windings with different turn ratios and supplying the transformed voltages to components in electric or electronic equipment, a switching output unit for outputting a switching control signal to the switching transformer, a count detector for detecting the output current from the switching output unit, and error detection/feedback circuit for receiving a desired one of the output voltages from the switching transformer and for detecting a voltage error corresponding to the received voltage, a pulse width modulation circuit for generating a pulse width modulation signal with a desired duty cycle ratio in response to an output signal from the current detector and an output signal from the error detection/feedback circuit and for outputting the generated pulse width modulation signal to the switching output unit to control the switching time thereof, an initial drive voltage supply circuit for supplying an initial drive voltage to the pulse width modulation circuit and an initial drive voltage blocking circuit for blocking the initial drive voltage from the initial drive voltage supply circuit to the pulse width modulation circuit when the switching mode power supply begins to operate.

Initially, the output voltage from the rectifier is supplied to the drive voltage input terminal of the pulse width modulation circuit through the initial drive voltage supply circuit.

The pulse width modulation circuit outputs the pulse width modulation signal with the desired duty cycle ratio to the switching output unit which outputs the switching control signal to the switching transformer. The switching transformer outputs the voltages to the components of the equipment.

When the switching mode power supply begins to operate, the initial drive voltage blocking circuit prevents the initial drive voltage from being supplied to the pulse width modulation circuit.

If the switching transformer is short circuited, the amount of the output current therefrom is abruptly increased resulting in a reduction in the output voltages.

As a result, the drive voltage from the switching transformer to the pulse width modulation circuit is lowered below a value capable of driving the pulse width modulation circuit, thereby causing the pulse width modulation circuit to stop.

Since the pulse width modulation circuit then outputs no pulse width modulation signal, the switching output unit outputs no switching control signal to the switching transformer, thereby stopping the output of drive voltages to the components in the equipment.

However, a time delay is present from the short circuit of the switching transformer until there is a reduction of the drive voltage to the pulse width modulation circuit due to the electrostatic capacity of various elements in the switching transformer.

The pulse width modulation circuit is therefore still driven during the time delay, thereby causing the switching output unit to output the switching control signal to the switching transformer. As a result, the switching transformer supplies an overcurrent to the short circuit, resulting in damage to the equipment components.

SUMMARY OF THE INVENTION

Therefore, the present invention has been made in view of the above problem, and it is an object of the present invention to provide an overcurrent protection circuit for rapidly stopping the operation of a switching mode power supply when a short-circuit is caused in equipment containing the switching mode power supply device, to protect components in the equipment from overcurrent due to the short-circuit.

In accordance with the present invention, the above and other objects can be accomplished by a provision of an overcurrent protection circuit for a switching mode power supply having a switching transformer for transforming a rectified voltage into a plurality of drive voltages and a pulse width modulation circuit for generating a pulse width modulation signal in response to a desired one of the drive voltages from the switching transformer, comprising an overcurrent protection circuit connected between a drive voltage output terminal of the switching transformer and a drive voltage input terminal of the pulse width modulation circuit, for accelerating a drop of the drive voltage which is supplied from the switching transformer to the pulse width modulation circuit when the switching transformer is short-circuited.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
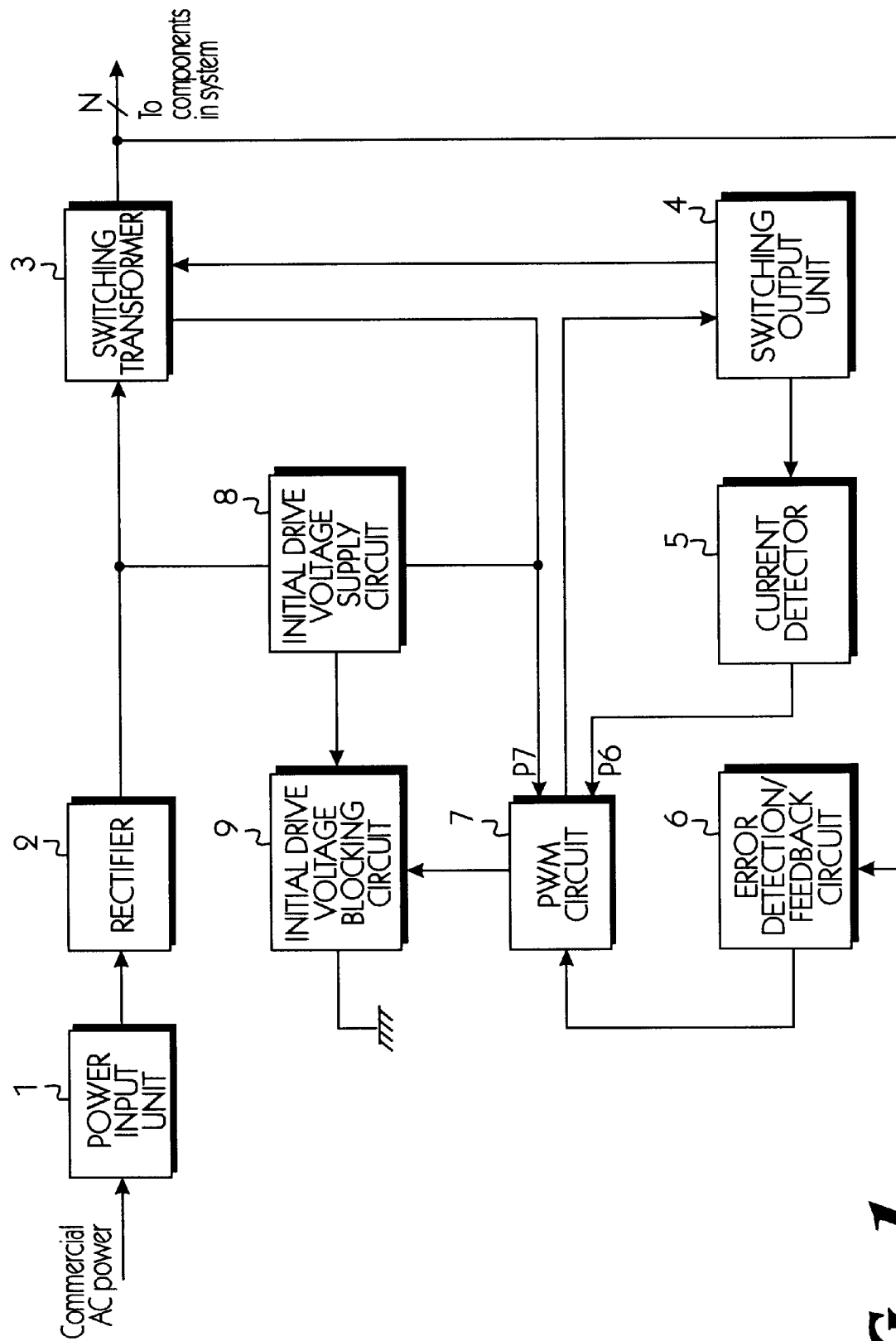
FIG. 1 is a schematic block diagram illustrating the construction of a switching mode power supply.

FIG. 1 is a schematic block diagram illustrating the construction of a switching mode power supply. As shown in this drawing, the switching mode power supply comprises a power input unit 1 for inputting external commercial alternating current (AC) power, a rectifier 2 for rectifying the AC power inputted by the power input unit 1 into direct current (DC) power, a switching transformer 3 for transforming an output DC voltage from the rectifier 2 into voltages of various levels using a plurality of windings with different turn ratios and supplying the transformed voltages to components in electric or electronic equipment, a switching output unit 4 for outputting a switching control signal to the switching transformer 3, and a current detector 5 for detecting output current from the switching output unit 4.

The switching mode power supply further comprises an error detection/feedback circuit 6 for receiving a desired one of the output voltages from the switching transformer 3 and for detecting a voltage error corresponding to the received voltage, a pulse width modulation (PWM) circuit 7 for generating a PWM signal with a desired duty cycle ratio in response to an output signal from the current detector 5 and an output signal from the error detection/feedback circuit 6 for and outputting the generated PWM signal to the switching output unit 4 to control a switching time thereof, an initial drive voltage supply circuit 8 for supplying an initial drive voltage to the PWM circuit 7, and an initial drive voltage blocking circuit 9 for blocking the initial drive voltage from the initial drive voltage supply circuit 8 to the PWM circuit 7 when the switching mode power supply begins to operate.

The operation of the switching mode power supply with the above-mentioned construction is described hereinafter.

At the initial power input state when the external commercial AC power begins to be supplied, the output DC voltage from the rectifier 2 is supplied to a drive voltage input terminal P7 of the PWM circuit 7 through the initial drive voltage supply circuit 8 to initially drive the PWM circuit 7.

As the PWM circuit 7 is initially driven, it outputs the PWM signal with the desired duty cycle ratio to the switching output unit 4, thereby allowing the switching output unit 4 to output the switching control signal to the switching transformer 3.

Upon receiving the switching control signal from the switching output unit 4, the switching transformer 3 transforms the DC voltage from the rectifier 2 into voltages of various levels using the plurality of windings with different turn ratios and supplies the transformed voltages to the components in the equipment.

When the switching mode power supply begins to operate as mentioned above, the initial drive voltage blocking circuit 9 grounds the initial drive voltage from the initial drive voltage supply circuit 8 to the PWM circuit 7 in response to a reference voltage from the PWM circuit 7. As a result, the initial drive voltage from the initial drive voltage supply circuit 8 is not supplied to the PWM circuit 7.

Then, the PWM circuit 7 remains in its driven state in response to a desired DC drive voltage which is supplied from the switching transformer 3 to the drive voltage input terminal P7.

Noticeably, because the switching transformer 3 is composed of a plurality of windings with different turn ratios, a short circuit may occur due to interconnections between the windings.

When the switching transformer 3 is short-circuited, the amount of output current therefrom is abruptly increased due to a load variation, resulting in a reduction in output voltages. In other words, because the output current from the switching transformer 3 is greatly increased under the condition that the output power from the switching transformer 3 is constant, the output voltages from the switching transformer 3 which are in inverse proportion to the output current are reduced below normal values.

As a result, the drive voltage from the switching transformer 3 to the PWM circuit 7 is lowered below a value capable of driving the PWM circuit 7, thereby causing the PWM circuit 7 operation to be stopped. Since the PWM circuit 7 is stopped, it outputs no PWM signal.

Because the PWM circuit 7 outputs no PWM signal, the switching output unit 4 outputs no switching control signal to the switching transformer 3. As a result, the switching transformer 3 stops the output of drive voltages to the components in the equipment.

However, a certain time delay is present from the short-circuit of the switching transformer 3 until there is a reduction of the drive voltage to the PWM circuit 7 below the value capable of driving the PWM circuit 7.

Such a time delay is caused due to the electrostatic capacity of various elements in the switching transformer 3. The PWM circuit 7 is still driven during the delay time, thereby causing the switching output unit 4 to output the switching control signal to the switching transformer 3. As a result, the switching transformer 3 supplies overcurrent due to the short-circuit, resulting in damage to the equipment components.

Figure 2:
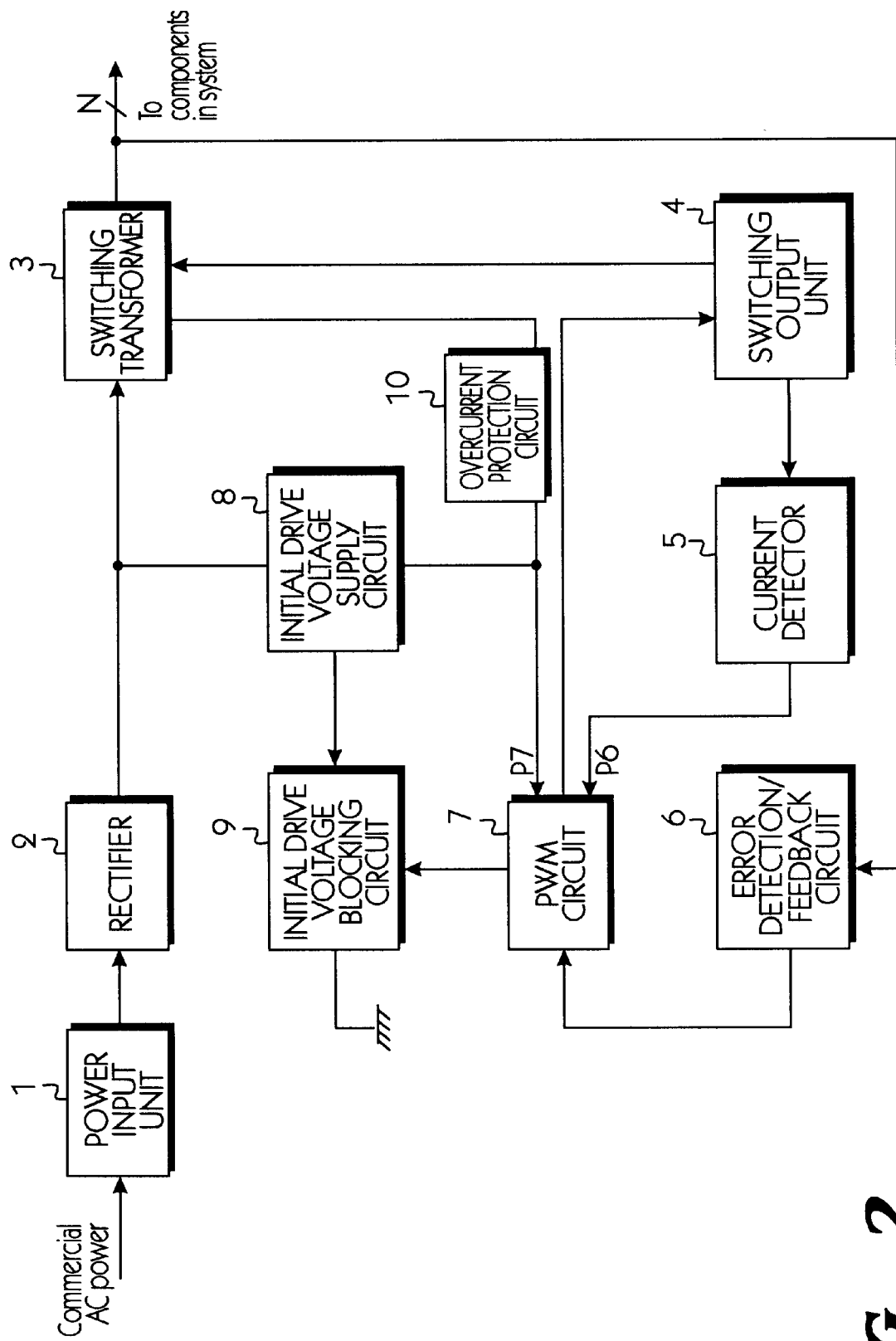
FIG. 2 is a schematic block diagram illustrating the construction of a switching mode power supply to which the present invention is applied.

FIG. 2 is a schematic block diagram illustrating the construction of a switching mode power supply to which the present invention is applied. The construction of this is substantially the same as that of FIG. 1, with the exception that an overcurrent protection circuit 10 is further provided according to the present invention. The overcurrent protection circuit 10 has its input terminal connected to the drive voltage output terminal of the switching transformer 3 and its output terminal connected to the drive voltage input terminal P7 of the PWM circuit 7.

Figure 3:
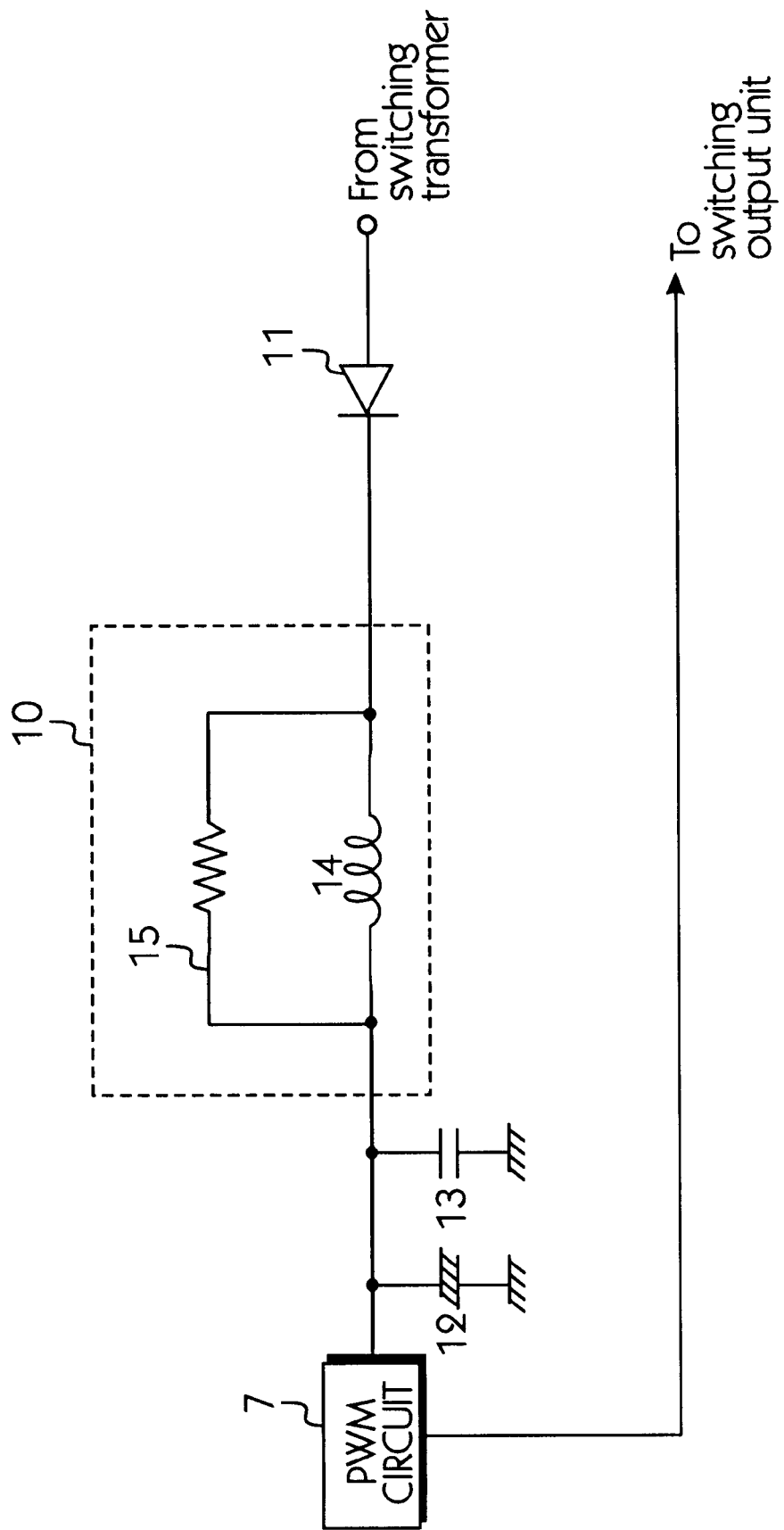
FIG. 3 is a detailed circuit diagram illustrating the construction of an overcurrent protection circuit in FIG. 2 in accordance with the present invention.

FIG. 3 is a detailed circuit diagram illustrating the construction of the overcurrent protection circuit 10 in FIG. 2 in accordance with the present invention. As shown in this drawing, the overcurrent protection circuit 10 comprises a rectifying diode 11 having its anode connected to the drive voltage output terminal of the switching transformer 3, and a parallel circuit having one terminal connected to a cathode of the rectifying diode 11 and another terminal connected in common to one terminal of a smoothing capacitor 12, one terminal of a high-frequency filtering capacitor 13 and the drive voltage input terminal P7 of the PWM circuit 7. The other terminals of the smoothing capacitor 12 and high-frequency filtering capacitor 13 are connected to ground.

The parallel circuit comprises a coil 14 and a resistor 15.

The operation of the overcurrent protection circuit 10 with the above-mentioned construction in accordance with the present invention is described in detail hereinafter.

An AC output voltage from the drive voltage output terminal of the switching transformer 3 is half-wave rectified by the rectifying diode 11 and supplied to the parallel connected coil 14 and resistor 15, which then removes a surge voltage component therefrom. The resultant voltage from the parallel connected coil 14 and resistor 15 is smoothed and converted into a DC voltage by the smoothing capacitor 12 and high-frequency filtering capacitor 13.

The converted DC voltage is supplied to the drive voltage input terminal P7 of the PWM circuit 7 to maintain the PWM circuit 7 at its driven state.

When the switching transformer 3 is short-circuited during the operation of the PWM circuit 7 as mentioned above, the amount of output current therefrom is instantaneously increased greatly due to a load variation, thereby causing the output voltages to be reduced below normal values.

As a result, the drive voltage from the switching transformer 3 to the PWM circuit 7 is abruptly lowered for a charging time of the parallel connected coil 14 and resistor 15. In other words, a counter electromotive force is generated by the coil 14 to reduce the drive voltage to the PWM circuit 7.

The charging time of the parallel connected coil 14 and resistor 15 is determined according to a reactance of the coil 14 and a resistance of the resistor 15 and can be expressed as follows:

$$\tau = \sqrt{RL}$$

where, '$\tau$' is a time constant of the charging time, 'L' is the reactance and 'R' is the resistance.

Hence, the drive voltage to the PWM circuit 7 is instantaneously reduced below the value capable of driving the PWM circuit 7, thereby causing the PWM circuit 7 operation to be stopped at once. As a result, the PWM circuit 7 stops the output of the PWM signal.

Because the PWM circuit 7 outputs no PWM signal, the switching output unit 4 outputs no switching control signal to the switching transformer 3. As a result, the switching transformer 3 stops the output of drive voltages to the components in the equipment.

In this manner, the switching transformer 3 stops the output of drive voltages more rapidly than one without the overcurrent protection circuit 10. Therefore, the components in the equipment can be protected from the overcurrent due to a short-circuit.

As apparent from the above description, according to the present invention, the overcurrent protection circuit rapidly cuts off the overcurrent due to a short-circuit which is caused in equipment containing the switching mode power supply. Therefore, the components in the equipment can be protected from the overcurrent due to a short-circuit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An overcurrent protection circuit for a switching mode power supply having a switching transformer for transforming a rectified voltage into a plurality of drive voltages and a pulse width modulation circuit for generating a pulse width modulation signal in response to a desired one of the drive voltages from said switching transformer, comprising an overcurrent protection means connected between a drive voltage output terminal of said switching transformer and a drive voltage input terminal of said pulse width modulation circuit, for accelerating a drop of said drive voltage supplied from said switching transformer to said pulse width modulation circuit when said switching transformer is short-circuited, said overcurrent protection means comprising a parallel circuit composed of an inductance and a resistance.

2. A switching mode power supply including an overcurrent protection circuit, the power supply comprising:

a switching transformer for transforming a rectified voltage into a plurality of drive voltages;

a pulse width modulation circuit connected to said switching transformer for generating a pulse width modulation signal in response to a desired one of the drive voltages from said switching transformer; and an overcurrent protection means connected between a drive voltage output terminal of said switching transformer and a drive voltage input terminal of said pulse width modulation circuit, said overcurrent protection means accelerating a drop of said drive voltage supplied from said switching transformer to said pulse width modulation circuit when said switching transformer is short circuited, said overcurrent protection means comprising a parallel circuit composed of an inductance and a resistance.

* * * * *